United States Patent
White (10) Patent No.: US 10,744,751 B2
(45) Date of Patent: *Aug. 18, 2020

(54) SIGN SUPPORT

(71) Applicant: K-International, Inc., Waukegan, IL (US)

(72) Inventor: Michael J. White, Ripon, WI (US)

(73) Assignee: K-International, Inc., Waukegan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/216,583

(22) Filed: Dec. 11, 2018

(65) Prior Publication Data

US 2019/0105890 A1    Apr. 11, 2019

Related U.S. Application Data

(63) Continuation of application No. 12/718,050, filed on Mar. 5, 2010, now Pat. No. 10,265,938.

(51) Int. Cl.
*B32B 38/00* (2006.01)
*G09F 15/00* (2006.01)

(52) U.S. Cl.
CPC .............. *B32B 38/00* (2013.01); *G09F 15/00* (2013.01)

(58) Field of Classification Search
None
See application file for complete search history.

(56) References Cited

U.S. PATENT DOCUMENTS

| | | | | |
|---|---|---|---|---|
| 6,321,475 B1 * | 11/2001 | Glanz | ................... | A47F 5/0068 248/220.41 |
| 6,341,755 B1 * | 1/2002 | Kump | ................... | A47F 5/0068 248/220.41 |
| D454,918 S * | 3/2002 | Wamsley | ....................... | D20/43 |
| 6,568,113 B1 * | 5/2003 | Valiulis | ................... | G09F 3/204 40/653 |
| 6,644,606 B1 * | 11/2003 | Seidel | ....................... | G09F 7/18 248/220.41 |
| 6,698,124 B2 * | 3/2004 | Kump | ................... | A47F 5/0823 248/220.41 |

* cited by examiner

*Primary Examiner* — David R Dunn
*Assistant Examiner* — Christopher E Veraa
(74) *Attorney, Agent, or Firm* — Schiff Hardin LLP (57) ABSTRACT

A sign support includes a mounting bracket and a sign holder. The mounting bracket selectively engages an associated fixture. The sign holder has a mounting bracket engaging member and a sign holding member that engages and holds a sign. An adhesive fastens the mounting bracket engaging member to the mounting bracket. The adhesive is an upstream adhesive such that the user receives the mounting bracket already bonded to the sign holder.

5 Claims, 7 Drawing Sheets

SIGN SUPPORT

CROSS-REFERENCE TO RELATED APPLICATION

This is a Continuation Patent Application of co-pending U.S. patent application Ser. No. 12/718,050, filed on Mar. 5, 2010, which is incorporated herein by reference.

TECHNICAL FIELD

The technical field of the apparatus disclosed herein relates to sign supports such as sign supports of the type that support signs on product display shelves.

BACKGROUND

Signs that display product information for products, such as foods, batteries, household items, etc. are commonly mounted to the front edges of horizontally extending shelves or to vertical shelf posts that support the horizontally extending shelves.

Display signs and hangers sometimes extend into the aisle of the store and, therefore, are prone to damage or dislodgement by accidental contact from passing customers. Occasionally, the protruding items may injure a shopper walking down the aisle.

For example, display signs are often placed in high traffic areas such as aisles running between shelves, display racks, pallet racks, etc. The signs that are supported with these sign holders often times are bumped by customers as the customers walk down the aisles. Also, the signs may be lifted upward by an upper-cut motion of customers who are straightening up after reaching for products that are displayed on lower shelves, which tends to dislodge the sign support from the mounting bracket.

Kump shows a conventional sign support in U.S. Pat. No. 6,698,124 having a hinge that supports a sign on a vertical shelf post of a merchandise shelf unit. The hinge permits the sign support to bend when a customer accidentally comes into contact with the sign support, thereby avoiding or at least minimizing damage or dislodgement of the sign or injury to the shopper walking down the aisle.

However, sign supports such as shown by Kump are assembled by the user from separate components that are often times mixed in a single box and shipped to the user for assembly and use. The user must both sort out the individual parts in the box and then slidably assemble the components together. Users do not want to spend the extra time necessary for these sorting and assembling operations, nor do they want the chance that the sign support can become free of its engaging bracket base.

The sign holder disclosed herein overcomes one or more of these or other problems.

DETAILED DESCRIPTION

Figure 1:
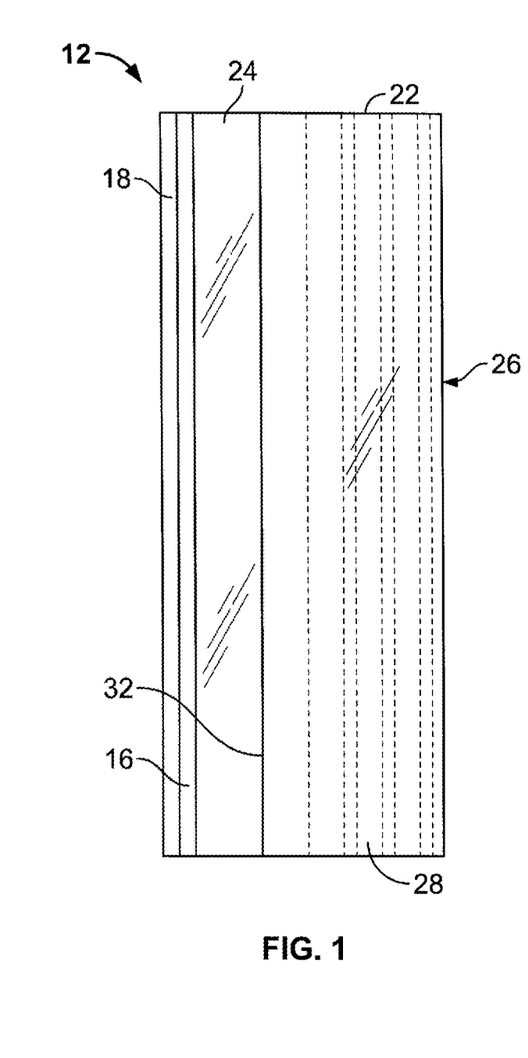
FIG. 1 is a side view of a sign holder that forms one portion of the sign support disclosed herein.
Figure 2:
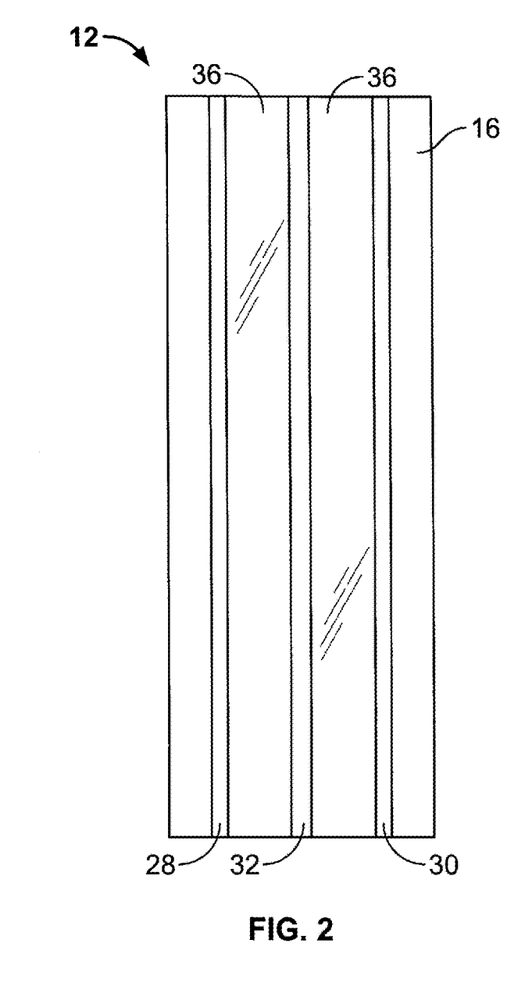
FIG. 2 is a front view of the sign holder of FIG. 1.
Figure 3:
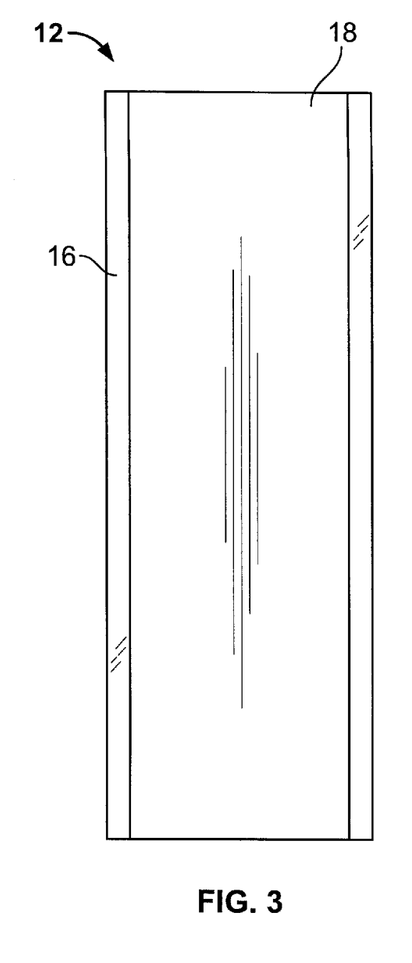
FIG. 3 is a back view of the sign holder of FIG. 1.
Figure 4:
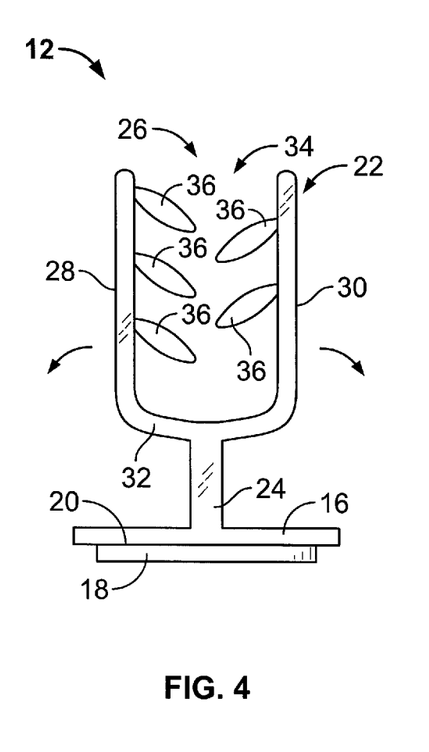
FIG. 4 is an end view of the sign holder of FIG. 1.
Figure 5:
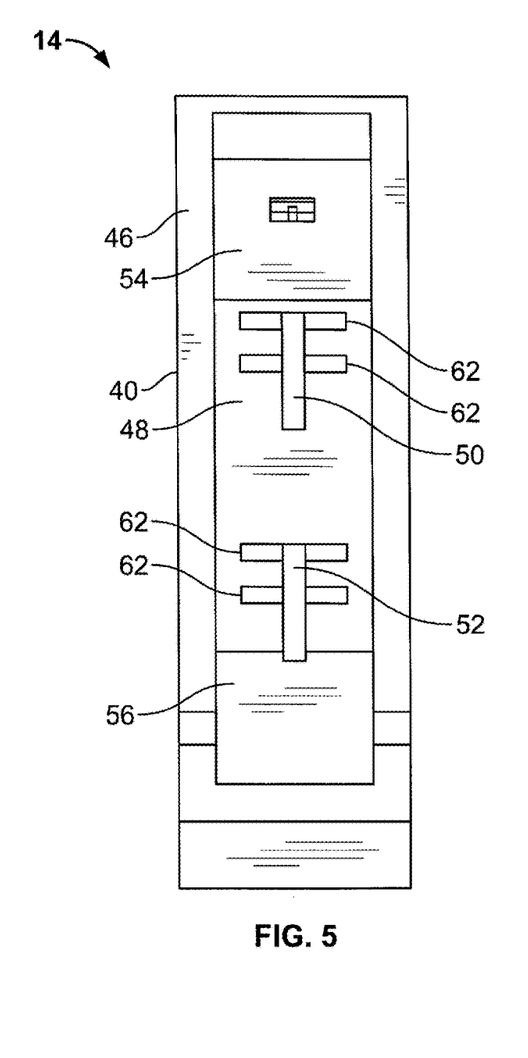
FIG. 5 is a front view of a mounting bracket that forms another portion of the sign support disclosed herein.
Figure 6:
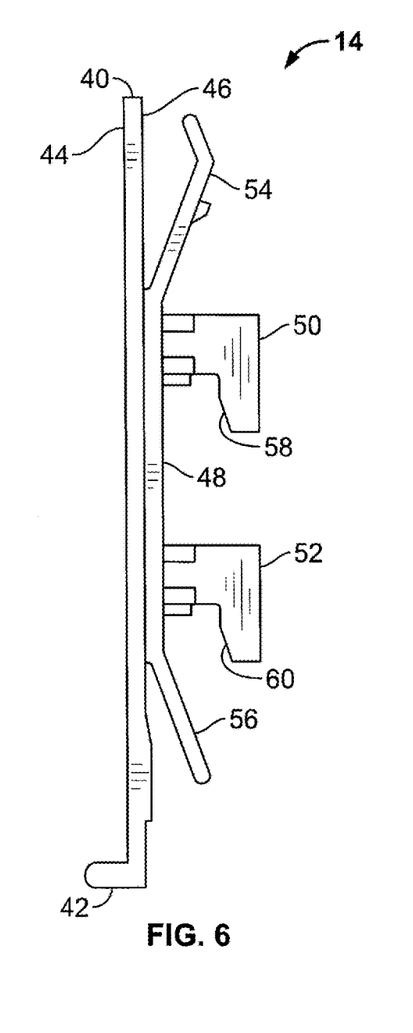
FIG. 6 is a side view of the mounting bracket of FIG. 5.
Figure 7:
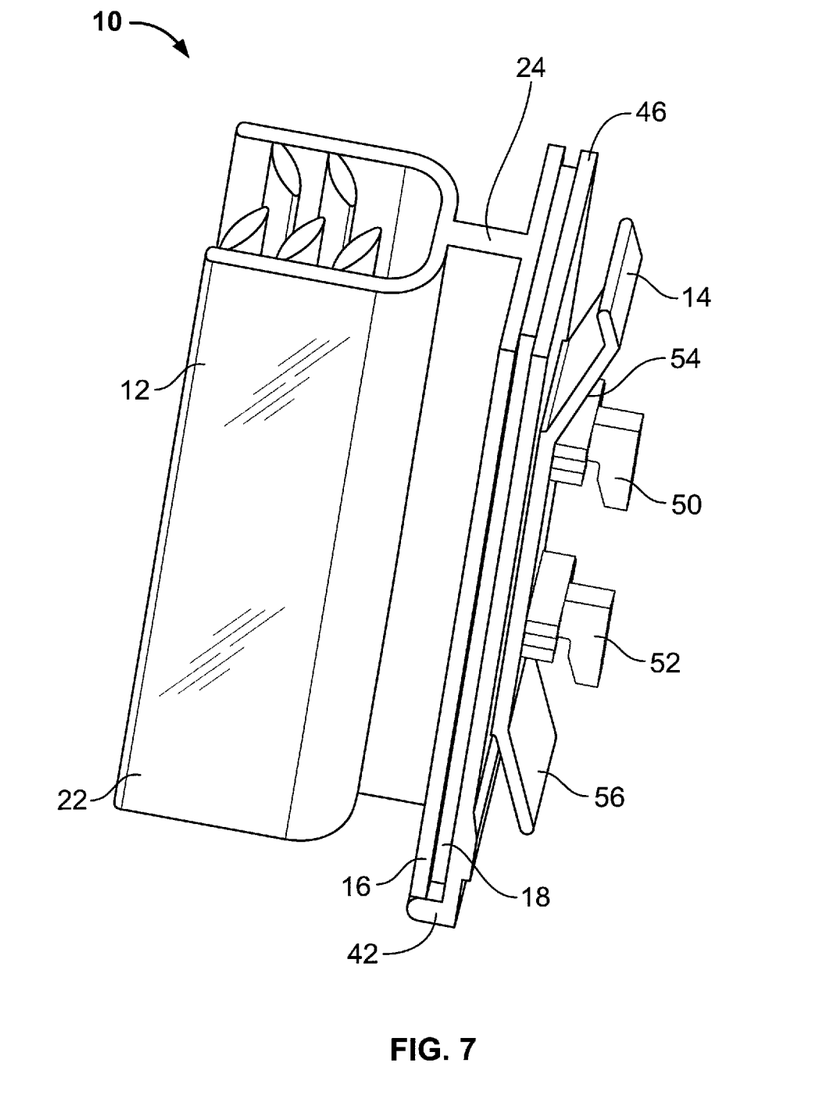
FIG. 7 is a perspective view of the sign support assembled from the sign holder of FIGS. 1-4 and the mounting bracket of FIGS. 5 and 6.

A sign support 10 includes a sign holder 12 (shown in FIGS. 1-4 and 7) and a mounting bracket 14 (shown in FIGS. 5-7). As shown in FIGS. 1-4 and 7, the sign holder 12 has an engagement member 16 supporting a fastener 18. The engagement portion includes a planar wall 20 that supports the fastener 18. The fastener 18, for example, may be an adhesive adhered to the wall 20. The fastener 18, for example, may have a removable cover on the surface facing away from the wall 20. The sign holder 12 is fastened to the mounting bracket 14 upstream of the retailer or other vendor who applies the sign support 10 to hold a sign. For example, the sign holder 12 is fastened to the mounting bracket 14 in the factory so that the sign holder 12 and the mounting bracket 14 cannot become separated once the sign support 10 leaves the factory. Thus, the adhesive 18 is an upstream adhesive because it is applied to the sign holder 12 and the mounting bracket 14 upstream of the user who uses the sign support 10 to hold a sign. To fasten the sign holder 12 to the mounting bracket 14, the removable cover is peeled away and the adhesive is pressed against the mounting bracket 14 to adhere the sign holder 12 to the mounting bracket 14.

The sign holder 12 further includes a sign holding member 12 for holding a sign. The sign holding member 12 is connected to the engagement member 16 by a hinge member 24 such that the sign holding member 12 extends forwardly from the engagement member 16. The hinge member 24 is resiliently flexible to permit the sign holding member 12 to bend, flex, and/or pivot with respect to the engagement member 16 such as upon contact with a customer. Once the force applied such as by contact with a customer is removed, the hinge member 24 flexes back returning the sign holding member 12 to its original position with respect to the engagement member 16.

The sign holding member 12 is formed as a U-shaped channel 26. The sign holding member 12 includes two side walls 28 and 30 extending forwardly from a central wall 32 to define the U-shaped channel 26 that receives a sign. The hinge member 24 connects the central wall 32 of the sign holding member 12 to the engagement member 16. The U-shaped channel 26 has an inlet end 34 opposite the central wall 32. If desired although not required, the longest dimension of the U-shaped channel 26 is generally parallel to and coextensive with the longest dimension of the hinge member 24, with the longest dimensions of the hinge member 24 and the U-shaped channel 26 being vertically oriented when the sign support 10 is mounted to an associated fixture such as a vertical shelf post.

The hinge member 24 flexes readily in the directions of the arrows of FIG. 4 when a force is applied to one or the other of the side walls 28 and 30.

Resiliently flexible fins 36 extend into the interior of the U-shaped channel 26 from each of the side walls 28 and 30 to frictionally engage opposite sides of a sign when the sign is inserted into the U-shaped channel 26. Preferably, the fins 36 are oriented such that their distal tips point rearwardly from the inlet end 34 toward the central wall 32 of the U-shaped channel 26. Also preferably, the fins 36 extending from the side wall 28 are offset from the fins 36 extending from the side wall 30 as shown in FIG. 4. The fins 36 flex rearwardly when a sign is inserted into the U-shaped channel 26, grip the sign, and resist removal of the sign from the sign holder 12.

Thus, the sign holder 12 releasably and frictionally holds a sign that, for example, may be a sheet of plastic, card, paper, or the like. The sign may as desired display information such as price about the products on the shelves.

As shown in FIGS. 5-7, the mounting bracket 14 is arranged to mount on a vertical support surface, such as a vertical shelf post, although the mounting bracket 14 may be arranged to mount on a horizontal support surface, such as a shelf.

The mounting bracket 14 has a generally planar member 40 having a ledge 42 at a distal end thereof and opposite front and rear faces 44 and 46. Except for the ledge 42, the front face 44 of the mounting bracket 14 is planar to match the planar wall 20. The mounting bracket 14 also has a reinforcing member 48 on the rear face 46. Hook-shaped fingers 50 and 52 extend away and downwardly from the rear face 46. The reinforcing member 48 includes flexible and resilient wings 54 and 56 that are angled with respect to the rear face 46. The fingers 50 and 52 have cam surfaces 58 and 60 on downwardly extending surfaces of the fingers 50 and 52 that face the rear face 46. The fingers 50 and 52 also have reinforcing ribs 62 to add rigidity to the fingers 50 and 52.

The supplier of the sign support 10 uses the fastener 18 between the planar wall 20 and the planar front face 44 of the of the mounting bracket 14 to fasten the engagement member 16 of the sign holder 12 to the front face 44 of the mounting bracket 14 in a position where the engagement member 16 of the sign holder 12 abuts the ledge 42 of the mounting bracket 14 as shown in FIG. 7. When the fastener 18 is an adhesive and has a removable cover as discussed above, the removable cover over the adhesive is peeled away from the adhesive and the adhesive is pressed against the front face 44 of the mounting bracket 14 in a position where the engagement member 16 of the sign holder 12 abuts the ledge 42 of the mounting bracket 14 as shown in FIG. 7. The sign holder 10 is then shipped to a user such as a retailer.

The mounting bracket 14 is applied by the user to a vertical shelf post 72 (FIG. 8) such that the fingers 50 and 52 extend into corresponding holes 74 in the vertical shelf post 72. A downward force is exerted on the sign support 10 such that the sign holder 12 and the mounting bracket 14 move downwardly. As the mounting bracket 14 moves downwardly, the cam surfaces 58 and 60 of the fingers 50 and 52 engage the rear surface of the vertical shelf post 72 which forces the fingers 50 and 52 deeper into their corresponding holes 74. As the fingers 50 and 52 move deeper into their corresponding holes 74, the flexible and resilient wings 54 and 56 flexibly and resiliently engage the front surface of the vertical shelf post 72 to releasably clamp the mounting bracket 14 to the vertical shelf post 72.

Figure 8:
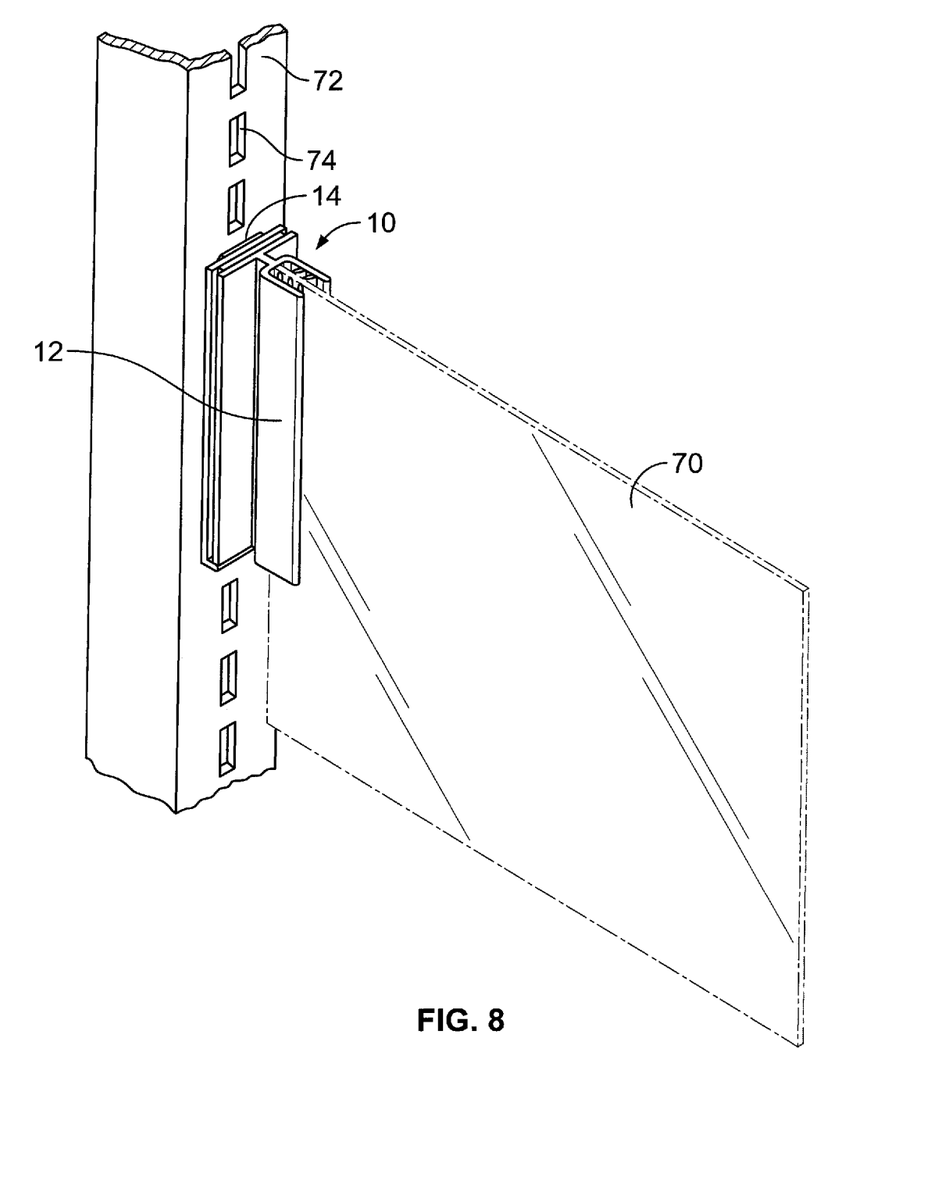
FIG. 8 is a perspective view of the sign support that supports a sign and that is mounted to a vertical shelf post.

Thus, the cam surfaces 58 and 60 and the flexible and resilient wings 54 and 56 form a clamp to releasably clamp the mounting bracket 14 to the vertical shelf post 72. However, the clamp may be otherwise configured.

As shown in FIG. 8, the user may then apply a sign 70 to a shelf unit by inserting the sign 70 through the inlet end 34 of the U-shaped channel 26 such that the fins 36 flex rearwardly to grip the sign 70. As indicated above, the fins 36 resist removal of the sign 70 from the sign holder 12.

The sign 70 can be moved to a different location by simply removing the sign 70 from the sign holder 12 and affixing the sign 70 to a different sign holder at a new location or by removing the sign holder 12 from the vertical shelf post 72 in its current location and applying the same sign holder 12 to a new location.

The sign holder 12 may be integrally formed such as by extrusion of a suitable plastic or by other known manufacturing methods. The plastic of the sign holder 12 can be a clear or translucent flexibly resilient plastic. The mounting bracket 14 may be formed from a relatively more rigid plastic.

The arrangement for the sign holder 12 as described above minimizes the chance that the sign support can become free from its mounting bracket base.

Figure 9:
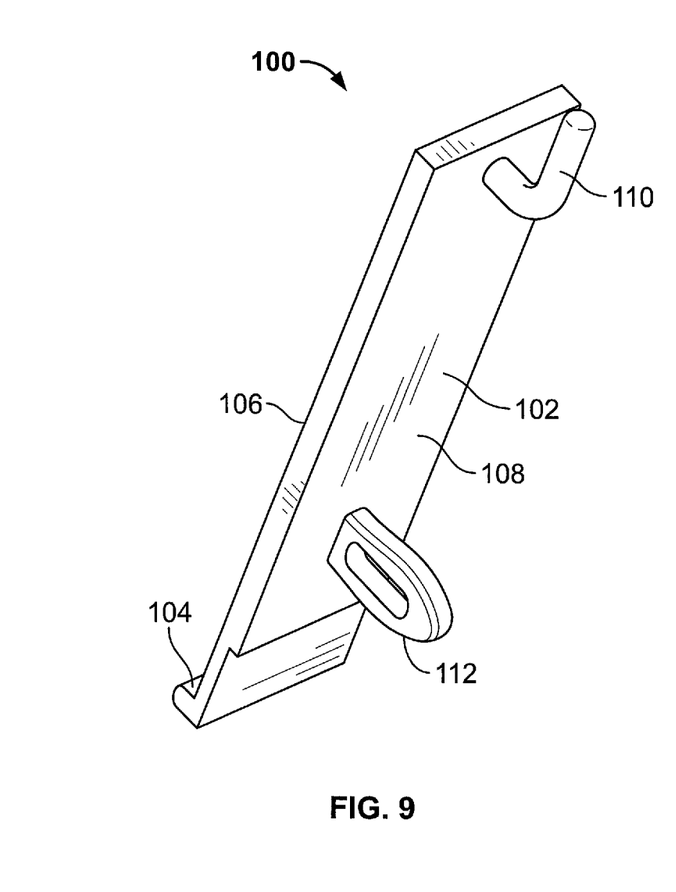
FIG. 9 shows a second embodiment of a mounting bracket.

FIG. 9 shows a mounting bracket 100 that can be used instead of the mounting bracket 14. The mounting bracket 100 is arranged to mount on a support. The mounting bracket 100 has a generally planar member 102 having a ledge 104 at a distal end thereof and opposite front and rear faces 106 and 108. A generally L-shaped finger 10 and a slotted finger 12 extend away from the rear face 108.

The supplier of the sign support 10 uses the fastener 18 to fasten the engagement member 16 of the sign holder 12 to the front face 106 of the mounting bracket 100 in a position where the engagement member 16 of the sign holder 12 abuts the ledge 104 of the mounting bracket 100. The sign holder 10 is then shipped to a user such as a retailer.

The mounting bracket 100 is applied by the user to a shelf such that the fingers 10 and 12 extend into corresponding holes in the support.

Figure 10:
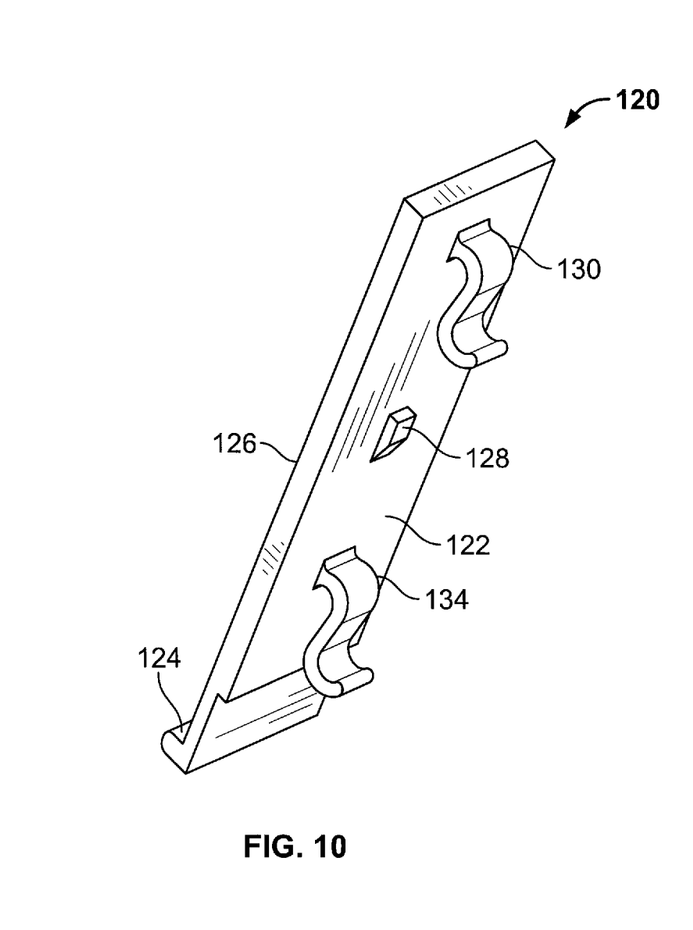
FIG. 10 shows a third embodiment of a mounting bracket.

FIG. 10 shows an alternative mounting bracket 120 arranged to be mounted on a support. The mounting bracket 120 has a generally planar member 112 having a ledge 124 at a distal end thereof and opposite front and rear faces 126 and 128. Generally depending fingers 130 and 132 extend away from the rear face 128.

The supplier of the sign support 10 uses the fastener 18 to fasten the engagement member 16 of the sign holder 12 to the front face 126 of the mounting bracket 120 in a position where the engagement member 16 of the sign holder 12 abuts the ledge 124 of the mounting bracket 120. The sign holder 10 is then shipped to a user such as a retailer.

The mounting bracket 120 is applied by the user to a support such that the fingers 130 and 132 extend into corresponding holes in the support.

Figure 11:
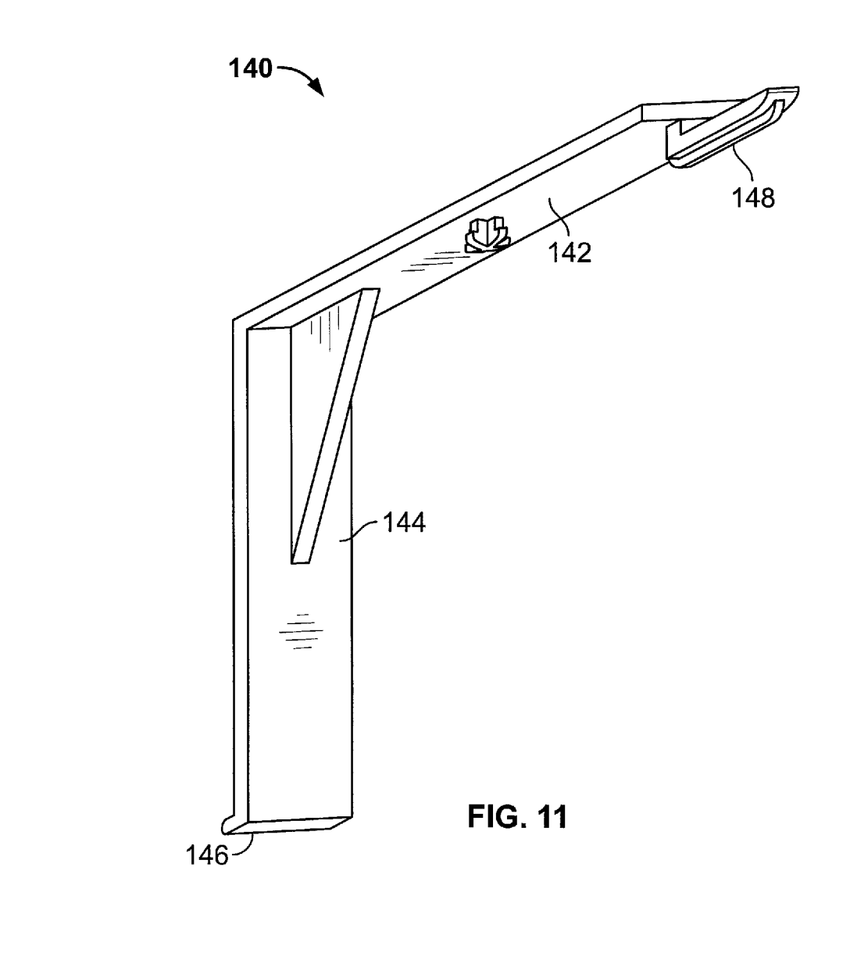
FIG. 11 shows a fourth embodiment of a mounting bracket.

FIG. 1 shows another alternative mounting bracket 140 arranged to be mounted on a support. The mounting bracket 140 is generally L-shaped having generally planar members 142 and 144 forming the legs of an L. The member 144 has a ledge 146 at a distal end thereof. A generally L-shaped finger 148 is provided at a distal end of the member 142.

The supplier of the sign support 10 uses the fastener 18 to fasten the engagement member 16 of the sign holder 12 to the member 144 in a position where the engagement member 16 of the sign holder 12 abuts the ledge 146 of the mounting bracket 140. The sign holder 10 is then shipped to a user such as a retailer.

The mounting bracket 120 is applied by the user to a support such that the finger 148 extends into a hole in the support.

Figure 12:
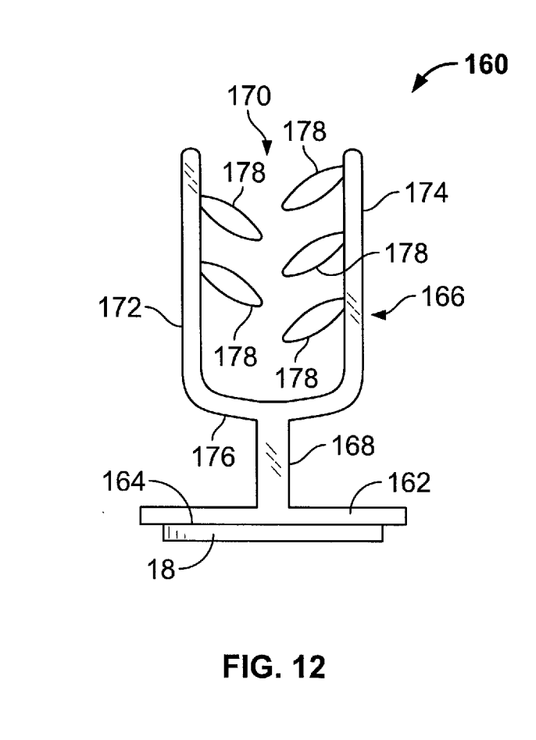
FIG. 12 shows a second embodiment of a sign holder.

An alternative sign holder 160 is shown in FIG. 12 and has an engagement member 162 supporting the fastener 18. The engagement portion includes a generally planar wall 164 that supports the fastener 18. The sign holder 160 further includes a sign holding member 166 for holding a sign. The sign holding member 166 is connected to the engagement member 162 by a rigid non-hinge member 168 such that the sign holding member 166 extends forwardly from the engagement member 162. The sign holding member 166 is formed as a U-shaped channel 170. The sign holding member 166 includes two side walls 172 and 174 extending forwardly from a central wall 176 to define the U-shaped channel 170 that receives a sign. The member 168 connects the central wall 176 of the sign holding member 166 to the engagement member 162. Resiliently flexible fins 178 extend into the interior of the U-shaped channel 170 from each of the side walls 172 and 174 to frictionally engage opposite sides of a sign when the sign is inserted into the U-shaped channel 26. Thus, the sign holder 170 releasably and frictionally holds a sign.

Certain modifications of the sign support 10 have been discussed above. Other modifications of the sign support 10 will occur to those practicing in the art of the present invention. For example, the sign support 10 can be used to support signs of any shape or size, and the sign support 10 can be used to support items other than signs such as product packages.

Also, the shape of the sign support 10 may be other than shown in the drawings.

Moreover, devices such as screws or clips may be used instead of the fins 36 to hold a sign in the sign holder 12.

Although the sign support comprises a mounting bracket that selectively engages an associated fixture, a sign holder that has a mounting bracket engaging member and a sign holding member and that engages and holds a sign, and an adhesive that fastens the mounting bracket engaging member of the sign holder to the mounting bracket, the adhesive is preferably an upstream adhesive. Thus, the sign holder and the mounting bracket cannot become separated during shipment to and receipt by the user of the sign support 10.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method of assembling and shipping a sign support, wherein the sign support comprises a mounting bracket and a sign holder, wherein the mounting bracket is arranged to selectively engage an associated fixture, wherein the sign holder has a mounting bracket engaging member and a sign holding member, wherein the sign holding member is arranged to engage and hold a sign, and wherein the method comprises:

selecting a mounting bracket and a corresponding sign holder having adhesive applied to at least one of the mounting bracket and the sign holder;

abutting the mounting bracket engaging member of the sign holder against a ledge extending from mounting bracket to align the mounting bracket engaging member with the sign holder;

adhesively adhering the mounting bracket engaging member to the mounting bracket to form the sign support; and     shipping the sign support so formed to a customer.

2. A method as claimed in claim 1, wherein the adhesive has a cover on the adhesive that is peeled off the adhesive prior to abutting the mounting bracket engaging member against the ledge.

3. A method as claimed in claim 1, wherein the adhesive is applied to the mounting bracket engaging member of the sign holder prior to abutting the mounting bracket engaging member against the ledge.

4. A method as claimed in claim 1, wherein the adhesive is applied to the mounting bracket.

5. A method as claimed in claim 1, wherein the adhesive has at least one removable cover that is peeled off the adhesive prior to abutting the mounting bracket engaging member against the ledge.

\* \* \* \* \*